Feb. 2, 1960   R. A. DAVIS   2,923,813
ANTENNA SYSTEMS
Filed Feb. 11, 1955   4 Sheets-Sheet 1
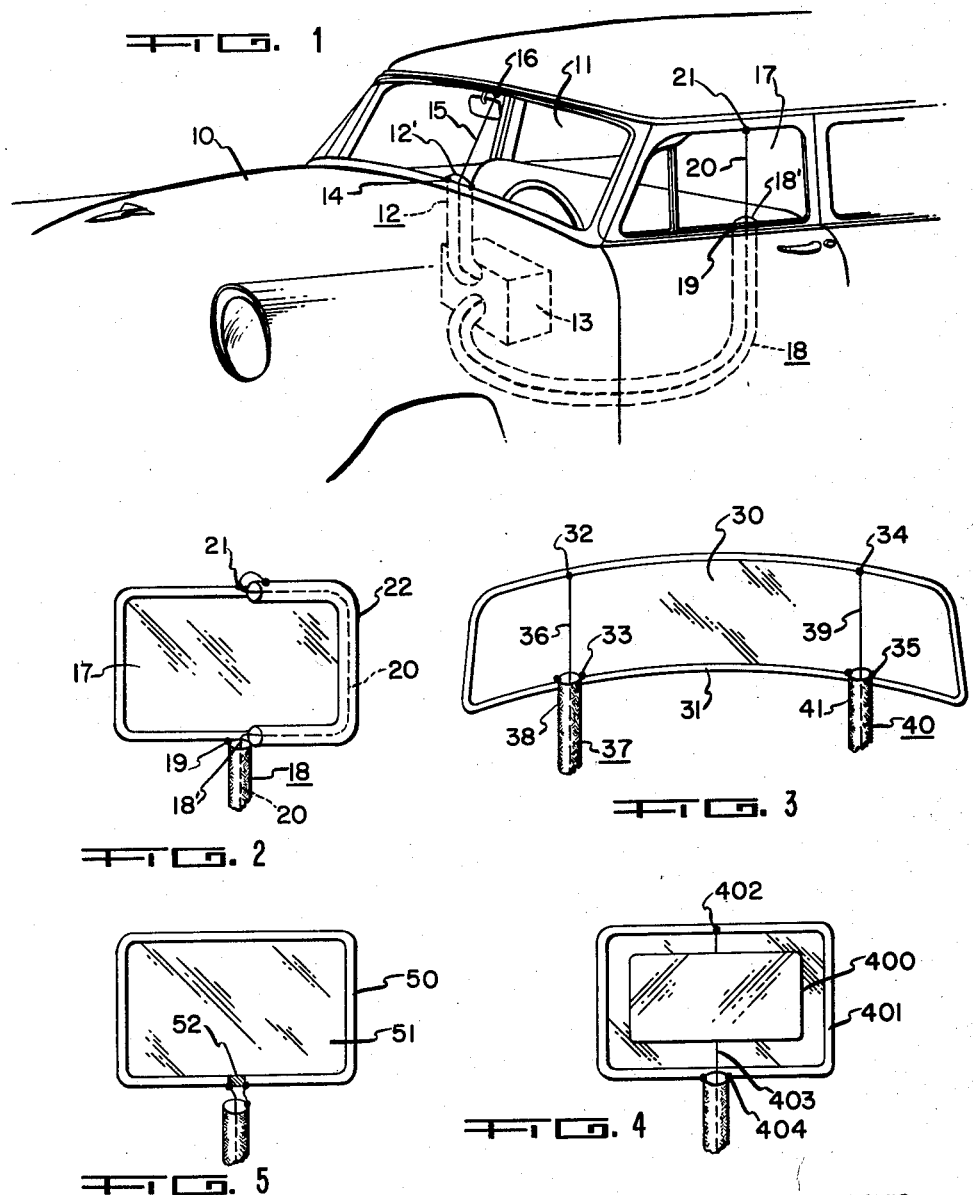
ROSS A. DAVIS
INVENTOR.
BY
HIS ATTORNEY Feb. 2, 1960    R. A. DAVIS    2,923,813
ANTENNA SYSTEMS
Filed Feb. 11, 1955    4 Sheets-Sheet 2
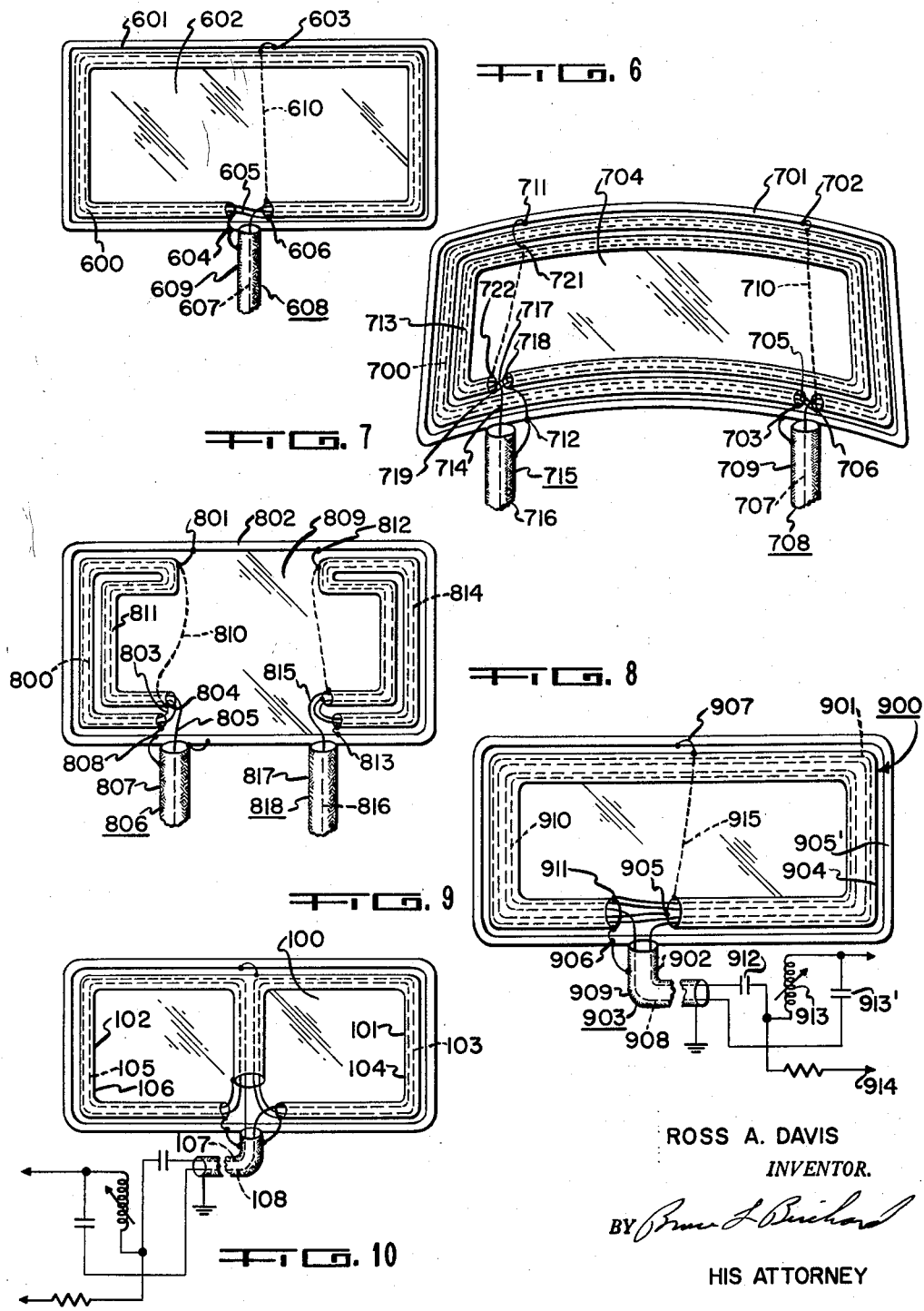
ROSS A. DAVIS
INVENTOR.
BY *(signature)*
HIS ATTORNEY Feb. 2, 1960   R. A. DAVIS   2,923,813
ANTENNA SYSTEMS
Filed Feb. 11, 1955   4 Sheets-Sheet 3
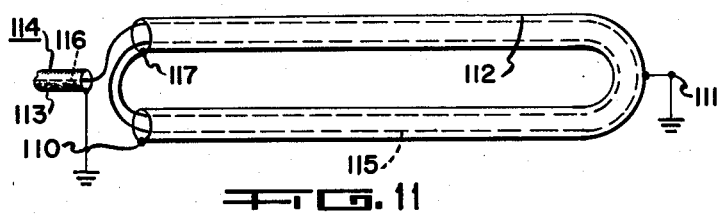
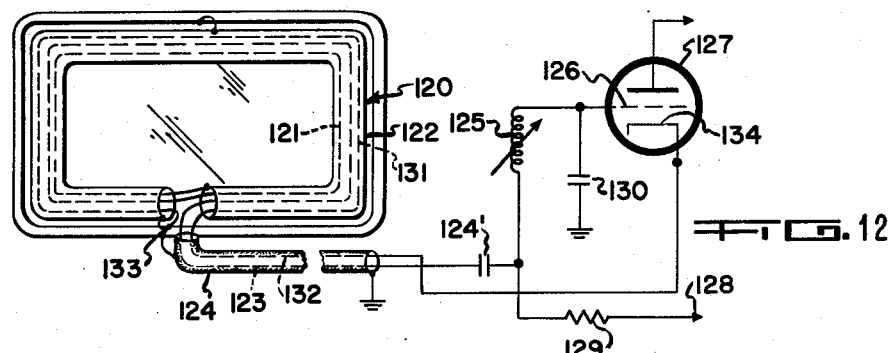
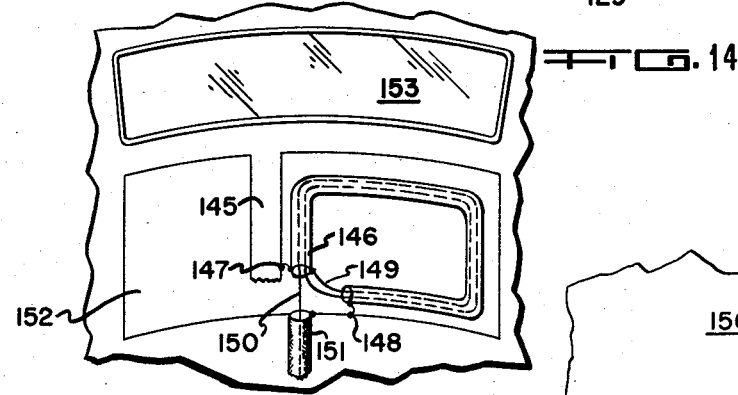
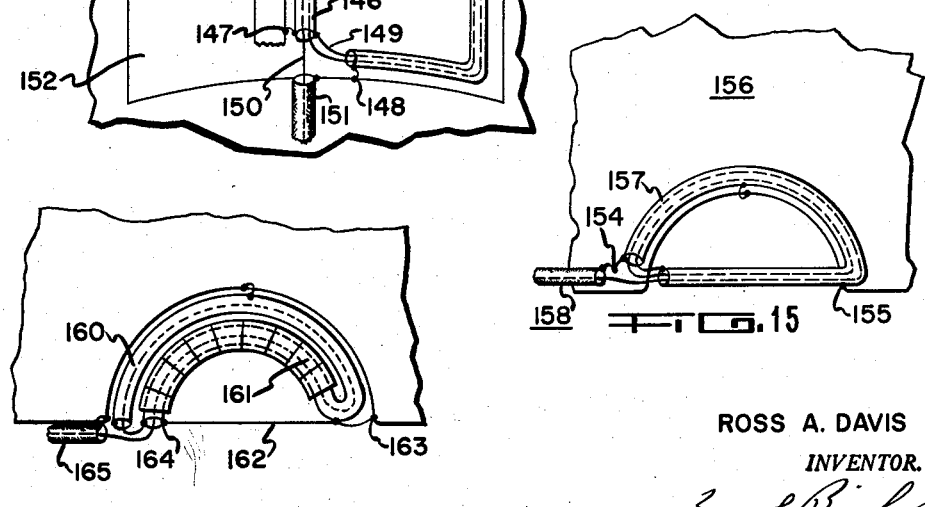
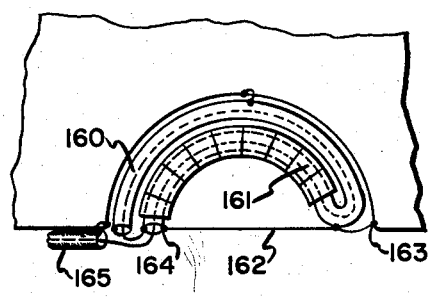
ROSS A. DAVIS
INVENTOR.
BY
HIS ATTORNEY

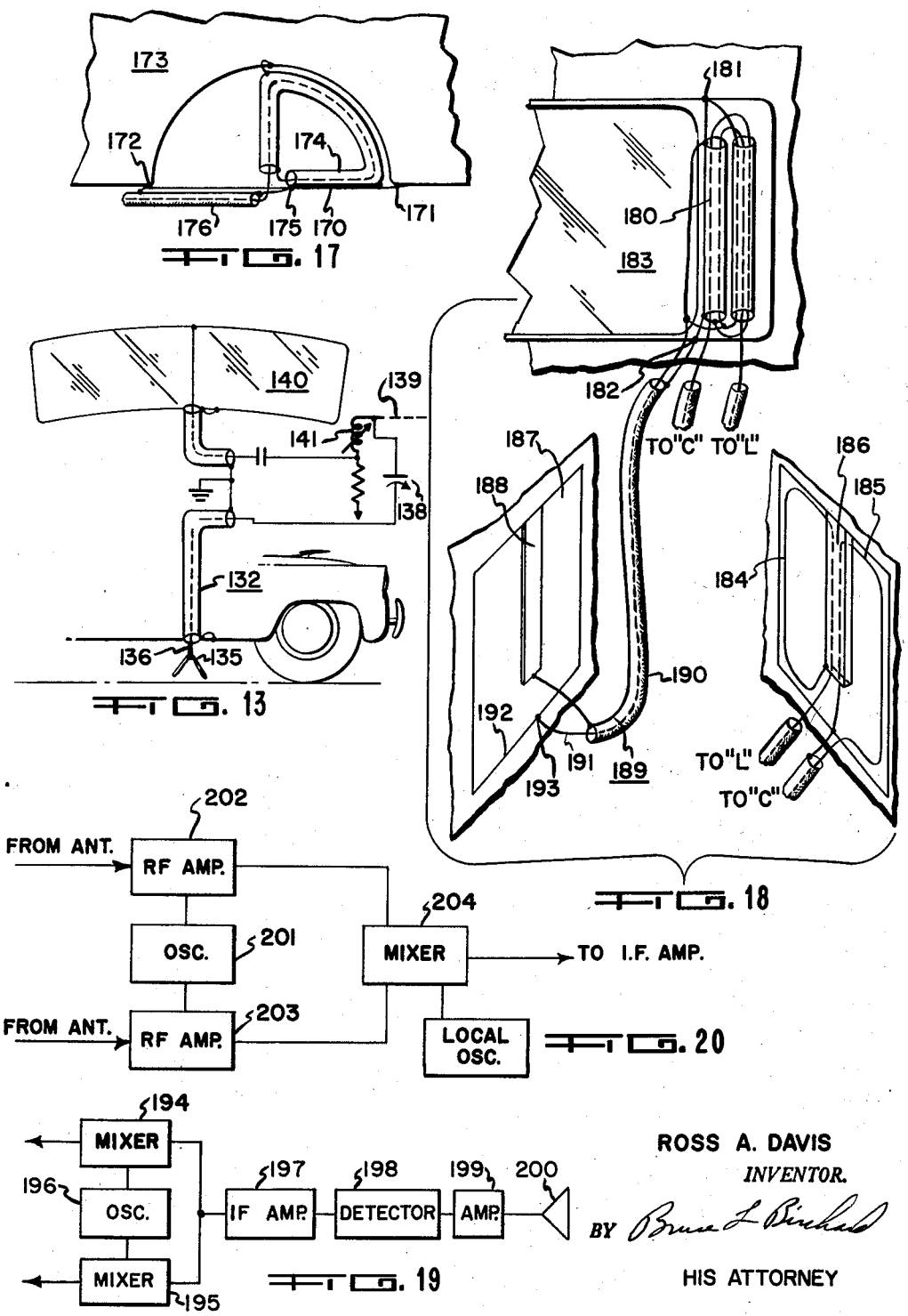

United States Patent Office 2,923,813
Patented Feb. 2, 1960

2,923,813

ANTENNA SYSTEMS

Ross A. Davis, Los Angeles, Calif.

Application February 11, 1955, Serial No. 487,535

7 Claims. (Cl. 250—20)

This application is a continuation-in-part of my earlier co-pending application, Serial No. 433,585, filed June 1, 1954, and entitled "Antenna Systems for Mobile Vehicles," now abandoned. On the whole, the subject matter of this application is identical with that of my earlier filed application already referred to, and the purpose of this application is to consolidate the basic concepts set forth in the earlier application with certain new and useful embodiments which were not covered in the earlier application.

This invention relates to improved antennas for radio transmission and reception and, more particularly, to antennas actively utilizing adjacent conductive structures, for example an automobile body, or part thereof, in the antenna system.

In the past, many attempts have been made to utilize conductive structures having other functions as radiators or receptors of electromagnetic waves. The most recent efforts in this direction have been in association with automobile bodies. Antennas of this variety have suffered universally from several undesirable characteristics. First, they have very low ultimate effectiveness by reason of the difficulty of optimizing the coupling of transmitting or receiving equipment to the extremely low-impedance and somewhat devious current paths which may conceivably exist in the mass of metal which constitutes a car body. A second difficulty resides in the lack of omnidirectionality exhibited by a vehicle body functioning in an antenna system. A third difficulty resides in the high ambient noise usually encountered when deriving a signal from a vehicle body.

Therefore, it is an object of this invention to provide an improved radio receiving or transmitting antenna utilizing as an active component a large mass of metal normally performing other functions.

It is a further object of this invention to provide a hidden antenna system for mobile vehicles which provides optimum electromagnetic signal interception and translation to associated receiving or transmitting equipment while simultaneously providing a high degree of omnidirectionality and a low noise level.

According to the present invention currents which have been found to flow about the perimeter of any discontinuity in a conductive mass, such as window openings in car bodies, are coupled, either directly or inductively through novel voltage transforming coupler arrangements which lie adjacent at least a portion of the perimeter of any such discontinuity or opening, to the antenna input or output circuits of associated radio apparatus. To effect the desired omnidirectionality, currents may be taken from two non-co-planar portions of the conductive masses contiguous to the discontinuities. The signals from such two regions may be selectively mixed so as to favor the stronger of the two signals and to produce the impression of omnidirectionality for the antenna system.

The features of the present invention which are believed to be novel are set forth with particularity in the appended claims. The present invention, both as to its organization and manner of operation, together with further objects and advantages thereof, may best be understood by reference to the following description, taken in connection with the accompanying drawings, in which:

Figure 1 is a diagrammatic presentation of one embodiment of the invention applied to an automobile.

Figure 2 is a sketch showing a configuration by which one portion of the antenna system of Figure 1 may be hidden.

Figure 3 is a modified form of Figure 1 utilizing a single discontinuity in a curved body.

Fgure 4 is an additional method for coupling to the current carrying perimeter of the discontinuity in the conductive body.

Fig. 5 shows the use of a window framing material for coupling to the electromagnetic currents in the adjacent conductive body.

Figure 6 is a first form of a combined conductive-inductive coupling to desired current carrying paths, in which voltage multiplication is simultaneously effected.

Figure 7 is a diagram showing dual coupling networks and a direct conduction path combined therewith for acquiring multiple and differing electromagnetic signals from a single body opening.

Figure 8 is a modified form of Figure 7.

Figure 9 shows a multiple coupling coils within a single harness associated with an opening and associated input circuitry.

Figure 10 is a modified form of Figure 9.

Figure 11 is a diagram of a voltage multiplying conductive coupler which may be connected directly between two separated points on a conductive body.

Figure 12 shows diagrammatically a voltage multiplying coupler or harness incorporating a feed-back winding.

Figure 13 shows an element which may be associated with the foregoing systems and the circuit for utilizing it.

Figure 14 shows the use of a secondary opening as a signal source.

Figures 15 through 17 show applications of the techniques of this invention to other portions of a car body.

Figure 18 is a diagram of a composite application of the subject invention which has proved highly satisfactory.

Figure 19 is a block diagram showing one circuit for mixing the signals from several non-co-planar regions of the conductive structure.

Figure 20 is a block diagram of a second circuit for utilizing signals from several non-co-planar regions of a conductive structure.

In Figure 1 car body 10, of a conducting material, has a front window opening 11 therein. As has been indicated, as a result of the electromagnetic fields which are constantly passing over the surface of body 10, currents are caused to flow in the conductive portions of body 10 immediately surrounding window opening 11. In essence, the portions of body 10 continguous to body opening 11 form a closed loop antenna. As a result of the current flow a voltage difference exists between point 16 and point 14 on opposite sides of window opening 11. By connecting inner conductor 15 of coaxial cable 12 to point 16 and sheath 12' of cable 12 to point 14 the voltage difference appearing between points 14 and 16 may be applied to the input terminals, not shown, of a radio receiver 13. Correspondingly, the electromagnetic currents flowing in the portions of body 10 bordering side window opening 17 produce a voltage drop between points 19 and 21 and by a connection of inner conductor 20 of coaxial cable 18 to point 21 and conductive sheath 18' of cable 18 to point 19 a radio frequency voltage may be applied to a second set of input terminals, not shown, on receiver 13. The radio frequency voltage thus applied to the receiver 13 will have substantially a 90° space phase relationship to that obtained across front window opening 11. Correspondingly, the null produced in each closed loop will lie at a different azimuthal point from that produced by the other closed loop antenna.

Obviously, it is desirable to make conductors 20 and 15 as inconspicuous as possible so as to avoid impairing the view of the driver or a passenger. Thus, conductors 15 and 20 may be other than the actual inner conductors of coaxial cables 12 and 18, respectively, themselves, but instead thin wires connected to the associated inner conductors. Conductors 15 and 20 may be imbedded in a narrow transparent adhesive material which may be cut to a desired length from a roll of such imbedded wire and easily applied to the windshield or the side window. Because of the need for opening the side window, it may, in that case, be necessary to simply leave the exposed thin wire connected to point 21.

If it is decided that the lead wire 15 or lead wire 20 must be totally hidden, it may be necessary to run them about the perimeter of the window opening closely adjacent the conductive border of each opening. Experiment has shown that, because of the low impedance of the adjacent conductive mass, the potential of the lead wire 20 will assume the potential of the adjacent conductive material and by the time it returns to the region of point 19 there is no potential difference between conductor 20 and sheath 18', or in the case of the front window opening, there is no potential difference between conductor 15 and sheath 12' when conductor 15 has traversed the perimeter of the front window opening and returned to the region of point 14. This disadvantage has been overcome by magnetically shielding conductors 15 and 20 from the immediately adjacent conductive portions of body 10. In Figure 2 the solution is shown as applied to side window 17 of Figure 1. A tube or sheath of ferrite material of high permeability and low energy loss 22 is placed over conductor 20 and magnetically isolates conductor 20 from the adjacent low-impedance conductive mass surrounding window opening 17.

Although, thus far, the discussion of the structures in Figures 1 and 2 has been limited to the application of this invention to receivers, it is equally applicable to use with transmitters of radio frequency energy. The reciprocal nature of antenna systems is well known in the art. It applies throughout the description which follows. It should be noted that the ferrite materials referred to are widely available on the commercial market and go under various trade names, such as Polyiron, etc. They are comminuted iron particles, usually hydrogen treated and imbedded in various types of binders.

If the mass of conductive material has an opening in a curved portion, signals having differing space phase characteristics may be derived from the single opening. The trend in modern automobiles is to provide so-called "wrap-around" windshields which require that the portion of the body which frames such windshields have the desired non-planar configurations. In Figure 3 there is shown a method for extracting two signals from a non-co-planar nature from the boundary of a single window opening. In Figure 3 window opening 30 is surrounded by a conductive boundary material 31 which may be a separate metallic beading connected to the vehicle body itself or it may be simply the edge of that vehicle body immediately surrounding window opening 30. By reason of the electromagnetic waves which pass over the boundary 31, radio frequency voltages will exist between points 32 and 33 and between points 34 and 35. The voltages appearing between points 32 and 33 will have a different space phase relationship from the voltages appearing between points 34 and 35, by reason of the non-planar nature of boundary conductor 31. To provide a pair of signal voltages for an associated radio receiver inner conductor 36 of cable 37 may be connected to point 32 and outer sheath 38 of that cable may be connected to point 33. Correspondingly, inner conductor 39 of cable 40 may be connected to point 34 and outer sheath 41 may be connected to point 35. Conductors 36 and 39 may be simply extensions of the inner conductors in cables 37 and 40, respectively, or may be separate wires connected to the inner conductors of such cables. In the event that it is desired to make conductors 36 and 39 less conspicuous, they may be located along the boundary conductor 31 in the region of its end portions. In such a case, it is desirable to utilize a ferrite magnetic isolating material in the same fashion as it was utilized in the embodiment of Figure 2. Each of the conductors 36 and 39 would then pass along its nearest edge of window opening 30.

In Figure 4 a thin conductive substantially transparent ribbon 400 is sandwiched between the sheets of a windshield glass or applied to the surface thereof contiguous to the conductive boundary 401. A conductive connection to point 402 of boundary 401 may be made from conductive material 400. Connections to an external receiving circuit may be made from points 403 and 404. In this structure ribbon 400 may be considered to replace conductors 15 or 20 of Figure 1.

In Figure 5, beading 50 which frames opening 51 is split at point 52 and connections to external radio equipment are made across the separation. Bead 50 acts as a single turn coupling loop to the contiguous portions of the vehicle body, not shown, which also bounds opening 51.

As was indicated earlier, one of the problems which has been consistently encountered in the attempt to utilize vehicle bodies as antennas has been the low voltage level which is realized from direct connection across a discontinuity in the vehicle body. Figure 6 discloses one solution to this problem. In Figure 6, harness 600 of conductive material, such as copper braid, is supported contiguous to conductive boundary 601 surrounding opening 602. Harness 600 is directly connected to conductive boundary 601 at point 603, and at point 604 which is on substantially the opposite side of opening 602 from point 603. A conductor 605 is connected at point 606 to the free end of conductive harness 600 and passes through harness 600 to form a plurality of turns and finally emerges for connection to inner conductor 607 of cable 608, the remaining conductor 609 of which is connected to conductive boundary 601 in the region of point 604. The operation of this antenna is as follows. The portion of conductive harness 600 connected between point 604 and point 603 acts as the input portion of an autotransformer across which the potential appearing between points 603 and 604 is impressed, this autotransformer effect resulting in a very usable R-F signal appearing between inner conductor 607 and the shield conductor 609 of cable 608. To minimize the undesirable loading effect produced by conductive boundary 601 between the portion of conductive harness 600 which is connected to point 603 and the open end of that harness at point 606, conductor 610 may be directly connected between point 603 and point 606. It may be undesirable to have the conductor 610 directly traverse the window opening in which case it may be necessary to encase conductor 610 in some ferrite material so that it may run directly along conductive boundary 601 without deleterious effects.

As has been indicated, it is desirable in utilizing vehicle bodies as antennas to obtain signals from two non-co-planar regions of the vehicle body. To accomplish this the simplest approach is to obtain signals from two openings lying one in the front of the vehicle and one in the side of it. If the front or rear window is curved, as is the case in many modern automobiles, two signals having the desired space phase relationship may be obtained from the single window by utilizing the duo-harness arrangements shown in Figures 7 and 8.

In Figure 7, conductive harness 700 is directly connected to conductive boundary 701 at point 702 and at point 703 which is spaced from point 702, and preferably on the opposite side of window opening 704 therefrom. Conductor 705 is connected to conductive harness 700 at point 706 and passes through harness 700 a plurality of times and finally emerges for connection to inner conductor 707 of cable 708, the conductive shield 709 of which is connected to point 703 on conductive boundary 701. The portion of conductive harness 700 proceeding from point 703 to point 702 acts as the primary portion of an autotransformer which provides the multiplied voltage between inner conductor 707 and shield conductor 709 of cable 708. An improvement in the voltage multiplication may be realized by connecting conductor 710 between point 702 and point 706. As described in connection with Figure 6, this conductor may be housed in a ferrite magnetic shield.

Similarly the R-F voltage appearing between points 711 and 712 on conductive boundary 701 are applied to conductive harness 713 by connection of those points to adjacent points on harness 713. An R-F signal appears between inner conductor 714 and outer shield 715 of cable 716 as a result of their respective connections to point 712 and the emergent end 716 of conductor 718, which has its remaining end connected to point 719 on harness 713. It may be deemed desirable to provide conductor 720 between point 721 on conductive harness 713 and point 722 on that harness. Experiments have shown that the R-F voltage appearing in cable 716 will have a different space phase characteristic from the voltages appearing in cable 708. Hence, upon connection of these two cables to appropriate input circuits of remote receiver apparatus, the desired omnidirectionality may be approached. It should be noted that in all of these embodiments utilizing harnesses, the radio frequency currents are supplied to the harness windings through a combination of both conductive and inductive effects. The currents flowing in the conductive boundaries surrounding the harnesses are directly connected into the autotransformer winding and are also induced therein in conventional transformer fashion. Further, it should be noted that although conductive harnesses 700 and 713 in Figure 7 appear to restrict visibility out of opening 704, they are, in fact, of relatively small diameter and may be hidden neatly beneath the decorative finishing molding which surrounds the conventional automobile window or windshield. In addition to the desirable aesthetic effects produced, the harnesses are also very effectively shielded from electrostatic fields, and noise from such sources as streetcar lines and fluorescent lights is reduced to an absolute minimum. By confining pick-up points to ones remote from the vehicle engines, and by utilizing only the currents circulating about the openings, rather than utilizing currents flowing over other portions of the body, ignition and wheel static noises are minimized.

In some instances it may be desirable not to traverse the entire perimeter of the window opening while at the same time it is still desirable to obtain two signals having a non-co-planar space phase relationship. This end may be accomplished by using the configuration shown in Figure 8. In that figure conductive harness 800 is folded back on itself to form a double U configuration and in the region where the two U-shaped portions join a connection is made to point 801 on conductive boundary 802. Conductor 803 is connected to point 804 on one end of harness 800 and makes several traversals of harness 800, finally emerging for connection to inner conductor 805 of cable 806, the outer sheath 807 of which is connected to point 808 on conductive boundary 802 of window opening 809. The remaining end of harness 800 is also connected to point 808. Conductor 810 may be interconnected between point 801 and point 804 to raise the R-F potential of that end of the harness 800. If it is desired to run conductor 810 closely adjacent conductive boundary 802, it may be desirable to provide a ferrite sheath so that conductor 810 will be magnetically shielded from conductive boundary 802. Similarly, a ferrite sheath may be placed about return leg 811 of harness 800.

Similarly, the R-F potential appearing between points 812 and 813 on conductive boundary 802 may be impressed across a second harness 814, of conductive braid or the like, and a multiplied R-F voltage will appear between conductor 815 and point 813, and, consequently, between inner conductor 816 and outer sheath 817 of cable 818. The signals impressed on cables 806 and 818, if properly combined at associated receiving apparatus, will provide nearly omnidirectional characteristics for the antenna system.

Figure 9 illustrates a modification of the coupling loop shown in Figure 6. In this form of the invention the coupling loop 900 comprises a plurality of turns of wire 901 forming a continuation of the inner conductor 902 of the cable 903 threaded through conductive sheath 904 and terminating at the point 905, one end of the sheath 904 being connected to the outer conductor 909 of cable 903 and to the conductive boundary on frame 905' at point 906, and the upper midpoint of sheath 904 being preferably, but not necessarily, connected to an adjacent point 907 on the conductive boundary 905'. The structure thus far described is identical with that shown in Figure 6. However, in the form of the invention illustrated in Figure 9, cable 903 includes a second conductor 908 which is connected to a second coupling loop comprising one or more turns of wire 910 enclosed within the sheath 904 and having its remote end connected, as indicated at 911, to the grounded end of the sheath 904. The coil comprising conductor 910 is wound in opposite sense to the coil comprising conductor 901 so that the signal potentials on conductors 902 and 908 are of opposite phase.

Connection of the coupling arrangement to the radio receiver may be as indicated in Figure 9, wherein the conductor 902 is connected through a coupling condenser 912 to one end of a tuning coil 913, the other end of that tuning coil being adapted for connection to the grid of a radio frequency amplifier tube (not shown). Conductor 904 may be connected, as shown, to one terminal of a tank condenser 913', the other terminal of which is connected to the grid end of the tuning coil 913. Grid return for the R-F amplifier tube may be provided by connecting the return end of the tuning coil 913 through a de-coupling resistance to an AVC circuit (not shown), as is represented diagrammatically at 914.

The arrangement shown in Figure 9 has the advantage of increased efficiency and sensitivity and finds particular utility in those unusual circumstances where the signal strengths developed by other types of coupling means shown herein are inadequate. Conductor 915 may be connected as shown and will generally afford an improved signal.

Figure 10 illustrates a modified form of the coupling circuit of Figure 9. As is shown in Figure 10, the window opening 100 is divided, a coupling loop assembly 101 being associated with one-half of the window and a coupling loop 102 being associated with the other half of the window, the coupling loop comprising the conductor 103 being associated with the assembly 101 and enclosed by a sheath 104, and the coupling loop defined by the conductor 105 being associated with the assembly 102 and enclosed within a sheath 106. In all other respects the arrangement is identical with that illustrated in Figure 9, the coupling of the two input conductors 107 and 108 to the radio receiver being identical with that for conductors 902 and 908 in Figure 9.

It will be seen that the coupling loop arrangements of Figures 6–10 provide a degree of signal multiplication depending, in part, upon the number of turns of wire within each harness. This signal multiplication results from the fact that the signal potential difference between points such as 603 and 604 is applied to one turn of the associated multi-turn coil. Since all turns of each coil are inductively linked, the coupling loop resembles an autotransformer, and the signal multiplication is proportional to the total number of turns in the coil. This same principle may be utilized to multiply to an adequate level potential differences existing between any two points of a vehicle, such as points 110 and 111 of Figure 11. When so used, the conductive harness 112 is given a hair pin or similar form, one end of the harness and the outer sheath 113 of cable 114 being connected to one selected point 110, another point on harness 112 being connected to the other point 111. The coil wire 115 forms a continuation of the inner conductor 116, the remaining end of the wire 115 being connected to harness 112 at point 117. The points 110 and 111 constitute any spaced points on a vehicle chassis between which a signal potential difference exists. The coupler of Figure 11 may be concealed in the top of the body, placed under the body floor, or concealed in the side panels of the body. The points 110 and 111 should be selected a few feet apart and are preferably located on opposite sides of and immediately adjacent to a discontinuity in the conductive body.

In Figure 12 there is illustrated a still further modified form of the invention which is similar to the arrangement shown in Figure 9, but which differs therefrom principally in providing for a certain amount of regeneration of the signal applied to the input stage of the radio receiver. As is show in Figure 12, the coupling means comprises a coupler assembly 120, with the coil 121 enclosed in the sheath 122 and connected to the inner conductor 123 of the cable 124, as has already been described in connection with Figure 9. The conductor 123 is connected to the radio receiver through the coupling condenser 124' and tuning coil 125 to the grid 126 of the first amplifier stage 127 in a manner suggested in connection with Figure 9. The lower end of the tuning coil 125 is connected to the grid return circuit 128 through the coupling resistor 129. The tank condenser 130 has its lower terminal grounded.

The desired regeneration is secured by including within the sheath 122 a coil of one or more turns of wire 131 forming a continuation of the second inner conductor 132 of the cable 124, the remote end of wire 131 being connected to the common ground point 133. Wire 132 connects to the cathode 134 of the cathode circuit, and cathode current flows through the coil 131 to induce in the pick-up coil 121 a corresponding signal which is applied to the grid 126 through the second inner conductor 123 of the cable 124.

It is found that a small amount of regeneration as obtained by the use of the apparatus disclosed in Figure 12 not only increases the effective gain of the first amplifier stage, but is superior to conventional forms of regeneration in that the signal level is built to maximum at its point of origin so as to minimize the amplification of noise and other unwanted signals.

In some instances it has been determined that an increase in input signal strength may be realized by providing a trimmer return path in the input circuit of the receiver which derives from as nearly an absolute ground potential as is feasible in a moving vehicle. This end has been effected by suspending an effective counterpoise made up of "whisker" elements beneath the vehicle. The circuitry involved is illustrated in Figure 13 in which whisker 135 is one or a plurality of conductive elements insulated from the body of the vehicle and supported beneath it and as near actual ground as possible without interfering with the motion of the vehicle. Whisker 135 is connected by means of inner conductor 136 of cable 137 to one set of plates in trimmer condenser 138, the other set of plates of which is connected to grid 139 of the first R-F amplifier stage in associated radio equipment, not shown. Radio frequency signals derived across window opening 140 are applied in a fashion previously described through permeability tuned input coil 141 to grid 139. Whisker 135 may perform incidental functions for the automobile vehicle, such as acting as curb feelers.

In certain automobiles there is a body discontinuity directly below the rear window and behind the rear seat of the vehicle. Figure 14 shows the technique for coupling to the currents flowing about the rear window opening. A pick-up coupling loop is placed in the body discontinuity behind the back seat of the car. In Figure 14 central support member 145 is severed at its lower end and conductive harness 146 is connected between point 147 near that lower end and point 148 on the lower conductive boundary of the opening. Conductor 149 traverses harness 146 a multiplicity of times in order to provide a voltage multiplication and ultimately emerges for connection to inner conductor 150 of cable 151. Current flowing about discontinuity 152 is produced by the currents flowing along the conductive boundary of rear window 153.

Thus far, reference has been made frequently to the use of window openings as the discontinuities across which radio frequency signals may be derived. Other discontinuities may be utilized, such as the discontinuities in automobile fenders. Several embodiments of such a system are shown in Figures 15 through 17. In Figure 15, the radio frequency voltage appearing between points 154 and 155 on fender 156 is applied to adjacent points on conductive hardness 157 wherein it is multiplied and is ultimately applied to cable 158.

In Figure 16 conductive harness 160 is embedded in a plastic fender skirt and the return leg 161 is magnetically shielded from adjacent body portions by means of a ferrite material. Additionally, connector 162 is provided between point 163 and the floating end 164 of harness 160. The multiplied voltage from harness 160 is applied to cable 165 for coupling to a remote radio receiver.

In Figure 17, a shorting bar 170 is connected between points 171 and 172 on fender 173. Conductive harness 174 is connected to shorting bar 170 at points 171 and 175. The voltage induced in harness 174 is applied to cable 176. Experiment has shown that by adding shorting bar 170 the azimuthal direction of the null exhibited by this antenna arrangement is substantially 90° displaced from that exhibited by either of the embodiments of Figures 15 or 16. It is theorized that transformation from an open circuited loop (as is substantially defined by the arcuate edge of fender 152) to a short circuited loop by the addition of bar 170 results in a shift in the direction of the null for the system.

In Figure 18 there is shown a combination of the elements in various embodiments disclosed earlier herein which has been demonstrated with great success to a number of organizations which are experts in the field of car radios. In Figure 18 conductive harness 180 is connected between points 181 and 182 on opposite sides of front window opening 183. Two multi-turn coupling and voltage multiplying loops pass through harness 180 for connection to an input circuit of the type described in connection with Figure 9. To obtain a degree of omnidirectionality a second signal is picked off a window opening on the right side of the vehicle by coupling loop 184 and, if desired, by a second loop 185, for coupling to a second input circuit of the radio receiver. The loops 184 and 185 are hidden on the return portion by center bar 186, which is conventional in some automobile side windows. To magnify the apparent space phase displacement between the signals from the front and right side windows an additional signal may be taken from across left window opening 187, for example by severing center bar 188 and connecting cable 189 across the gap, and fed into the front window loop which utilizes harness 180. It has been found desirable to reverse this connection so that the outer sheath 190 of the cable 189 is connected to the severed center bar and inner conductor 191 is connected to boundary 192 at point 193. This particular combination has demonstrated a very high degree of omnidirectionality, sufficient such that the AVC system of the receiver associated therewith could adequately overcome any existing signal weakness in any particular direction.

Various circuits have proved adequate for mixing the signals from the front and side antennas so as to realize the effect of omnidirectionality. One of these is shown in Figure 19. In that figure, mixer 194 is connected to one of the antennas and mixer 195 is connected to the other of the antennas. Signals from oscillator 196 are fed 180° out of phase into the two mixers with sufficient amplitude so that on the negative half-cycles one of the mixers is completely cut off and passes no R-F signal and on the other half-cycle of oscillator 196 the remaining mixer is totally cut off. During the time of conduction of either mixer, the conventional mixing action occurs and an intermediate frequency signal is taken from the conducting mixer and fed to I-F amplifier 197 beyond which is detected in detector 198 and appropriately amplified in amplifier 199 for reproduction by speaker 200.

In Figure 20, an alternative form of switching is demonstrated in which oscillator 201 is operating above the audible range and supplies two voltages 180° out of phase, one to R-F amplifier 202 and the other to R-F amplifier 203, to the respective ones of which the two antenna systems are connected. Oscillator 201 then keys R-F amplifiers 202 and 203 alternately at a supersonic speed. Mixer 204 performs a conventional function. The intermediate frequency signals emanating from mixer 204 are amplified, detected and reproduced in conventional fashion.

Various forms of mechanical switching may be utilized to assure the impression of complete omnidirectionality. For example, a switch element may be driven between two contact points at supersonic speed by a magnetic or magnetostrictive technique so that the two space-phased antennas may be connected alternately to the mixing circuit.

Thus it may be seen that there has been provided an antenna system which provides a high degree of omnidirectionality and good signal sensitivity, which is particularly adaptable to vehicles, but which may be incorporated wherever there is a large mass of metal which has discontinuities in it.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

I claim:

1. An antenna system including a structure having at least one discontinuity therein, such discontinuity having principal dimensions other than those required to make such opening self-resonant in its environment at the operating wavelengths of such system; a conductive boundary bordering said discontinuity; and coupling means for electrically intercoupling external radio apparatus to said boundary; said coupling means having a plurality of portions at least one of which is proximate to said boundary along one segment of said discontinuity and another of which is proximate to said boundary along another segment of said discontinuity, each of said portions including a conductor connected to a respective one of separate points spaced from each other on said conductive boundary, said coupling means further including a multi-turn coupling loop across a portion of which the remote ends of said conductors are connected to give auto-transformer action.

2. An antenna system including a structure having at least one discontinuity therein, such discontinuity having principal dimensions other than those required to make such opening self-resonant in its environment at the operating wavelengths of such system; a conductive boundary bordering said discontinuity; and coupling means for electrically intercoupling external radio apparatus to said boundary, said coupling means having at least first and second portions associated with said boundary along first and second segments, respectively, of said discontinuity; each of said portions having first and second conductors, said first and second conductors of said first portion each having one end connected to first and second points, respectively, along said conductive boundary on opposite sides of said discontinuity, said first and second conductors of said second portion each having one end connected to third and fourth points, respectively, along said conductive boundary on opposite sides of said discontinuity; each of said portions having a respective coupling loop lying along said conductive boundary, the remote ends of said first and second conductors of each of said portions being connected across at least a part of its said respective coupling loop to give auto-transformer action.

3. Apparatus according to claim 2 coupled to means for utilizing signals from each of said coupling loops.

4. Apparatus according to claim 3 in which said means for utilizing signals includes at least first and second R-F channels and a mixer, and means for alternately coupling each of said channels to said mixer.

5. An antenna system including a structure having at least one discontinuity therein; a conductive boundary bordering said discontinuity; such discontinuity in its environment having a resonant frequency materially exceeding the operating frequency of such system; and coupling means having a resonant frequency differing from said operating frequency, said coupling means having at least first and second portions associated with said boundary along first and second segments, respectively, of said discontinuity; each of said portions having first and second conductors, said first and second conductors of said first portion each having one end connected to first and second points, respectively, along said conductive boundary on opposite sides of said discontinuity, said boundary forming an electrical connection between said points, said first and second conductors of said second portion each having one end connected to third and fourth points, respectively, along said conductive boundary on opposite sides of said discontinuity; said boundary forming an electrical connection between the third and fourth points, said first and second points being spaced respectively from the third and fourth points, whereby signals of the same frequency but different phase are derived at said first and second portions.

6. An antenna system including a structure having at least one discontinuity therein; a conductive boundary bordering said discontinuity; such discontinuity in its environment having a resonant frequency materially exceeding the operating frequency of such system; coupling means having a resonant frequency differing from said operating frequency, said coupling means having at least first and second portions associated with said boundary along first and second segments, respectively, of said discontinuity; each of said portions having first and second conductors, said first and second conductors of said first portion each having one end connected to first and second points, respectively, along said conductive boundary on opposite sides of said discontinuity, said boundary forming an electrical connection between said points, said first and second conductors of said second portion each having one end connected to third and fourth points, respectively, along said conductive boundary on opposite sides of said discontinuity, said boundary forming an electrical connection between the third and fourth points, said first and second points being spaced respectively from the third and fourth points, whereby signals of the same frequency but different phase are derived at said first and second portions, and means for utilizing signals from each of said portions of said coupling means.

7. An antenna system including a structure having at least one discontinuity therein; a conductive boundary bordering said discontinuity; such discontinuity in its environment having a resonant frequency materially exceeding the operating frequency of such system; coupling means having a resonant frequency differing from said operating frequency, said coupling means having at least first and second portions associated with said boundary along said first and second segments, respectively, of said discontinuity; each of said portions having first and second conductors, said first and second conductors of said first portion each having one end connected to first and second points, respectively, along said conductive boundary on opposite sides of said discontinuity, said first and second conductors of said second portion each having one end connected to third and fourth points, respectively, along said conductive boundary on opposite sides of said discontinuity; and means for utilizing signals from each of said portions of said coupling means, said means for utilizing signals including at least first and second RF channels and a mixer, and means for alternately coupling each of said channels to said mixer.

References Cited in the file of this patent
UNITED STATES PATENTS

| | | |
|---|---|---|
| 1,762,974 | Friis | June 10, 1930 |
| 1,959,281 | Willoughby | May 17, 1934 |
| 2,070,159 | Ellis | Feb. 9, 1937 |
| 2,481,978 | Clough | Sept. 13, 1949 |
| 2,575,471 | Schweiss et al. | Nov. 20, 1951 |
| 2,601,510 | Frye | June 24, 1952 |
| 2,632,851 | Lees et al. | Mar. 24, 1953 |

FOREIGN PATENTS

| | | |
|---|---|---|
| 1,012,833 | France | Apr. 23, 1952 |

OTHER REFERENCES
"Electronics," February 1947, page 90.